United States Patent [19]

Nakamichi

[11] 3,849,799

[45] Nov. 19, 1974

[54] MAGNETIC RECORDING AND REPRODUCING APPARATUS

[75] Inventor: Niro Nakamichi, Tokyo, Japan

[73] Assignee: Nakamichi Research Incorporated, Kodaira City, Tokyo, Japan

[22] Filed: June 28, 1972

[21] Appl. No.: 267,180

[30] Foreign Application Priority Data

June 30, 1971 Japan .............................. 46-48325

[52] U.S. Cl. .............................................. 360/96
[51] Int. Cl. .............................................. G11b 5/00
[58] Field of Search .................... 274/4 E, 4 C, 4 D; 179/100.2 Z; 242/198–201

[56] References Cited

UNITED STATES PATENTS

| | | | |
|---|---|---|---|
| 3,586,336 | 6/1971 | Rosenblatt | 274/4 E |
| 3,638,953 | 2/1972 | Kodama et al. | 179/100.2 Z |
| 3,724,858 | 4/1973 | Martin | 274/4 E |
| 3,729,202 | 4/1973 | Wakabayashi | 274/4 E |

FOREIGN PATENTS OR APPLICATIONS

| | | | |
|---|---|---|---|
| 35,150 | 11/1970 | Japan | 274/4 E |

*Primary Examiner*—Harry N. Haroian
*Attorney, Agent, or Firm*—Watson Leavenworth Kelton & Taggart

[57] ABSTRACT

A magnetic recording and reproducing apparatus for use with a cassette containing a pair of reels between which a tape is wound, comprising a cassette receiving case pivotally movable on a chassis, said cassette receiving case having a first position in which the cassette can be inserted into and withdrawn from the cassette receiving case and a second position in which the cassette cooperates with a magnetic head and a capstan on the chassis, said cassette also including locating holes through which extend locating pins on the chassis for positively holding the cassette in the second position, and means for resiliently pushing the cassette forwardly so that the locating pins on the chassis press against the walls defining the locating holes to hold the cassette in position when the cassette receiving case is in the second position, is improved in that the cassette is free to move within the cassette receiving case through release from the resiliently pushing means before the locating pins on the chassis are located in the locating holes in the cassette when the cassette receiving case moves from the first position to the second position.

5 Claims, 11 Drawing Figures

MAGNETIC RECORDING AND REPRODUCING APPARATUS

BACKGROUND OF THE INVENTION

There has been proposed a magnetic recording and reproducing apparatus for use with a cassette containing a pair of reels between which a tape is wound, wherein a cassette receiving case for receiving a cassette is provided which is pivotally mounted on a chassis in the apparatus and urged by action of a spring provided between the cassette receiving case and the chassis to pivotally move upwardly about its pivot axis for insertion of the cassette into the cassette receiving case and withdrawal of the same therefrom. As is well known, the chassis has thereon a pair of reel shafts for driving the reels of the cassette, a capstan for feeding the tape in the cassette and a magnetic head for recording on the tape and reproducing therefrom. The cassette includes several locating holes through which extend corresponding locating pins on the chassis for positively holding the cassette in recording position. It is common that the diameter of the locating holes in the cassette is larger than that of the corresponding locating pins on the chassis in order to ease the insertion of the latter into the former and accordingly, the cassette is urged to move forwardly by action of a spring or the like so that the locating pins on the chassis are prevented from playing relative to the corresponding locating holes in the cassette to hold it in recording position. It should be noted that the spring exerts force on the cassette before the cassette receiving case reaches the recording position wherein the locating holes have the corresponding locating pins positioned therein.

Due to application of resilient force to the cassette the locating pins on the chassis resiliently engage or slide against the walls defining the locating holes in the cassette during insertion of the locating pins into the corresponding holes when the cassette receiving case moves from the non-operative position to the operative position, and therefore, after the cassette frequently has been inserted into and withdrawn from the cassette receiving case, the walls defining the locating holes in the cassette suffer wear, which makes it difficult to hold the cassette in the predetermined recording position and reliability in operation of the apparatus is degraded.

SUMMARY OF THE INVENTION

It is a principal object of the invention to provide a magnetic recording and reproducing apparatus for use with a cassette wherein wear of the walls defining the locating holes in the cassette is avoided when corresponding locating pins on a chassis are inserted into the locating holes while a cassette receiving case moves from a non-operative position to an operative position for the operation of the apparatus.

In accordance with the present invention there is provided a magnetic recording and reproducing apparatus for use with a cassette containing a pair of reels between which a tape is wound, comprising a chassis having thereon a pair of reel shafts for driving the reels of the cassette, a capstan for feeding the tape in the cassette and a magnetic head for recording on the tape and reproducing therefrom, said magnetic head being movable between an advanced position in which the head contacts the tape in the cassette and a retracted position in which the head is separated from the cassette, means for moving the head from the retracted position to the advanced position, a cassette receiving case pivotally movable on the chassis, said cassette receiving case having a first or non-operative position in which the cassette can be inserted into and withdrawn from the cassette receiving case and a second or operative position in which the cassette is disposed in cooperative position with the magnetic head and the capstan on the chassis to effect recording and reproducing, said cassette also including locating holes through which extend corresponding locating pins on the chassis for positively holding the cassette in such cooperative (recording or reproducing) position, means for moving the cassette receiving case from the operative position to the non-operative position, means for locking the cassette receiving case in the operative position, and means for resiliently pushing the cassette so that the locating pins on the chassis bear against the walls defining the locating holes in the cassette to hold the cassette in such cooperative position when the cassette receiving case is in the operative position, characterized in that said resiliently pushing means is associated with said cassette receiving case moving means so that said resiliently pushing means is restrained from pushing the cassette for movement of said cassette in said cassette receiving case before said locating pins on the chassis are inserted into the corresponding locating holes in the cassette.

BRIEF DESCRIPTION OF THE DRAWINGS

The other objects and attendant advantages of the invention will become apparent to those skilled in the art from the following description of the preferred embodiment taken in reference to the accompanying drawings.

In the drawings.

DETAILED DESCRIPTION OF THE EMBODIMENT

Figure 1A:
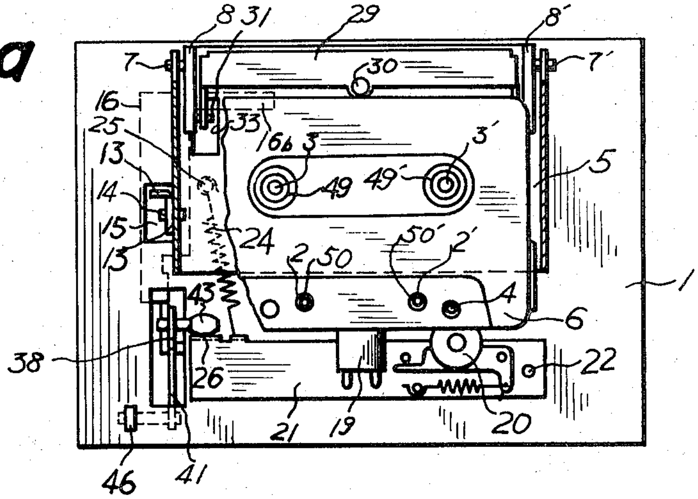
FIG. 1*a* is a plan view of the magnetic recording and reproducing apparatus in accordance with the present invention wherein a cassette receiving case is located in an operative position, with a portion of the cassette receiving case cut away for illustration of the features of the invention.
Figure 1B:
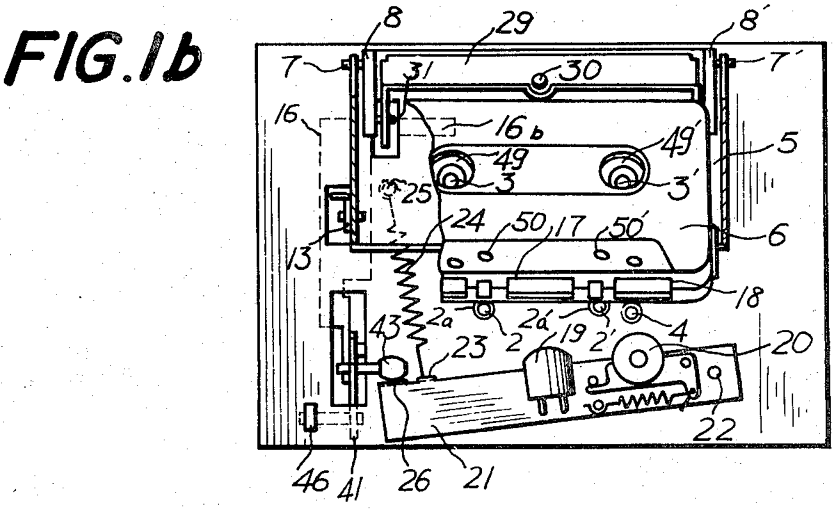
FIG. 1*b* is a plan view of the magnetic recording and reproducing apparatus in accordance with the present invention when the cassette receiving case is located in the non-operative position in which a cassette can be inserted into and withdrawn from the cassette receiving case which is partially cut away for illustration of the features of the invention.
Figure 2A:
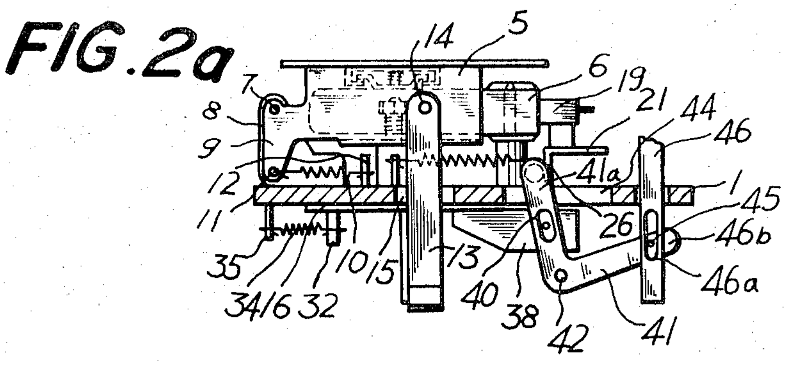
FIG. 2*a* is a lefthand side elevational view of the apparatus shown in FIG. 1*a;*

Referring to FIGS. 1*a* and 1*b*, a magnetic recording and reproducing apparatus in accordance with the present invention comprises a body of a cabinet not shown to be formed with a chassis 1 on which a pair of locating pins 2 and 2', a pair of reel shafts 3 and 3' and a capstan 4 are mounted in a proper arrangement in a conventional manner. The reel shafts and the capstan are arranged to be driven by a driving mechanism (not shown) which is disposed below the chassis 1. A cassette receiving case 5 which is adapted to receive a cassette 6 is pivotably mounted at the rear ends thereof on pivot pins 7 and 7' on a pair of brackets 8 and 8' which in turn are securely mounted on the chassis 1. The cassette receiving case 5, as shown in FIG. 2a is provided at the rear corners thereof with leg portions 9 extending downwardly from the corners and springs 10 are extended between and secured to respective pins 11 provided on the leg portions 3 and respective pins 12 provided on the chassis 1 to urge the cassette receiving case 5 to pivotally move upwardly about the pivot pins 7 and 7'. The cassette receiving case 5 is provided on one the side faces thereof with a suspension bar 13, the upper end of which is pivoted about a pin 14 on the side face of the case 5 and the lower end of which extends through an opening 15 provided on the chassis 1 and through a lock member 16 which is slidably mounted on the lower surface of the chassis 1 and projects from the lower surface of the lock member.

The casette 6 disposed within the cassette receiving case 5 is provided at its front face with an opening 17 through which a magnetic head extends as just-below described and an opening 18 through which a pinch roller extends as also just below described. A magnetic head 19 and a pinch roller 20 spaced from the head may be mounted on a head carrying lever 21 one end of which may be pivotably mounted about a pin 22 on the chassis 1 and the free end of which is provided with a lug 32 on which one end of a coil spring 24 is securely mounted and the other end of the spring 24 is securely mounted on a pin 25 projecting from the chassis 1. The spring 24 serves to bias the head carrying lever 21 towards the front face of the cassette 6. The lever 21 is provided at its free end with a downwardly extending lug 26 against which a roller 43 on a connecting member 41 hereinafter described is adapted to be engaged.

Figure 3A:
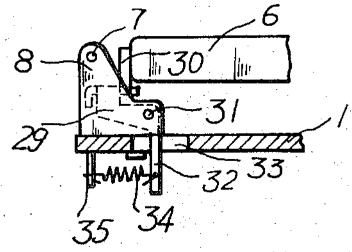
FIG. 3*a* is a side elevational view of the cassette in the operative position and a cassette pushing member illustrating the relationship between them.
Figure 3B:
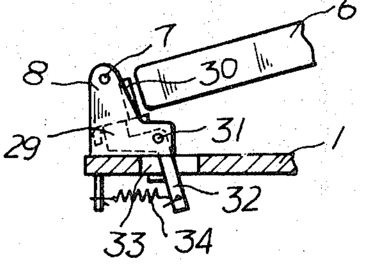
FIG. 3*b* is a side elevational view of the cassette in the position for insertion and withdrawal thereof and the cassette pushing member illustrating the relationship between them.

A swinging plate 29 from which a cassette pushing member 30 extends vertically and upwardly and is secured thereto is disposed between the pair of brackets 8 and 8' for pivotable movement about pivot pins 31 on the brackets. The swinging plate 29 is provided at one of the ends thereof with a leg piece 32 which extends through an opening 33 provided on the chassis 1 and to which is secured one end of a spring 34, the other end of which in turn is secured to a pin 35 extending downwardly from and secured to the lower face of the chassis 1. The spring 34 serves to normally urge the swinging plate 29 to be pivoted in a clockwise direction as viewed in FIG. 3a, which causes the cassette pushing member 30 to press against the rear face of the cassette 6. FIG. 3*a* shows the recording position of the cassette 6 in which it is forced horizontally towards the magnetic head 19 and the capstan 20, while FIG. 3*b* shows the position of the cassette 6 in which it is released from the cassette pushing member 30 when the cassette receiving case 5 is pivoted upwardly about the pins 7 and 7'.

Figure 4A:
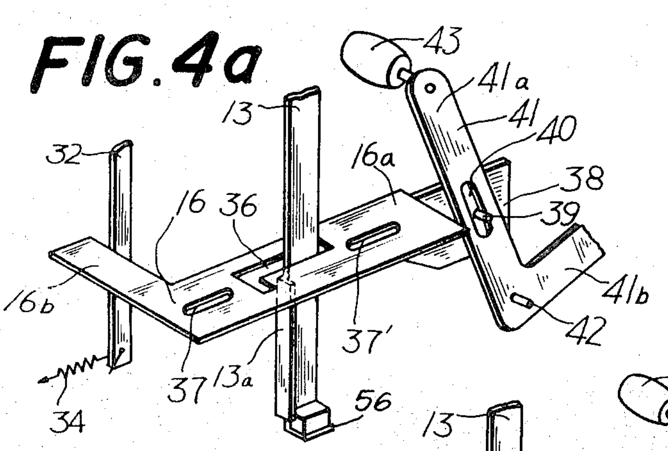
FIG. 4*a* is a perspective view of a lock member and the associated components illustrating the relationship between them when the cassette is held in the operative position.
Figure 4B:
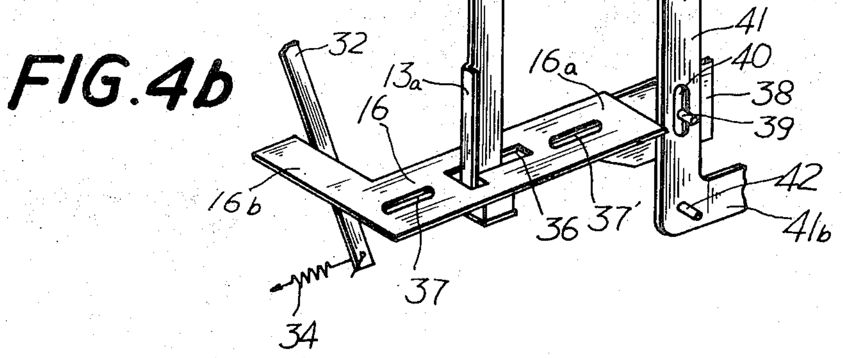
FIG. 4*b* is a perspective view of the lock member and the associated components illustrating the relationship between them when the cassette is in the position for insertion and withdrawal thereof.

The lock member 16, as shown in FIG. 4a, generally comprises a L-shaped plate, the wider arm **16*a* of which is provided with an L-shaped opening 36 at its middle portion through which the suspension bar 13 extends and a pair of guide slots 37 and 37' spaces from opposite ends of the opening 36, through which slots respective pins not shown extend for forward and rearward slidable movement of the lock member 16 relative to the chassis 1. The end of the wider arm 16*a* of the lock member 16 has a vertically and downwardly extending portion 38 to which a pin 39 is secured and extends horizontally therefrom through a slot 40 on one arm 41*a* of an L-shaped connecting member 41 as hereinafter described. The other arm 16*b* of the lock member 16 is arranged to engage the leg piece 32 of the swinging member 29 for its pivotal movement about the pivot pins 31.**

The connecting member 41 is provided at the connection of both arms with a pivot pin 42 which is journalled on the support on the housing of the apparatus for pivotable movement of the connecting member 41 about the axis of the pivot pin 42. One arm **41*a* of the connecting member 41 has a roller 43 pivotted at the upper end of the arm extending through the opening 44 of the chassis 1 for engaging the lug 26 on the lever 21 while the other arm 41*b* of the connecting member 41 has a pin 45 secured thereto and extending through a slot 46*a* of an actuating arm 46** as just-below described.

Figure 2B:
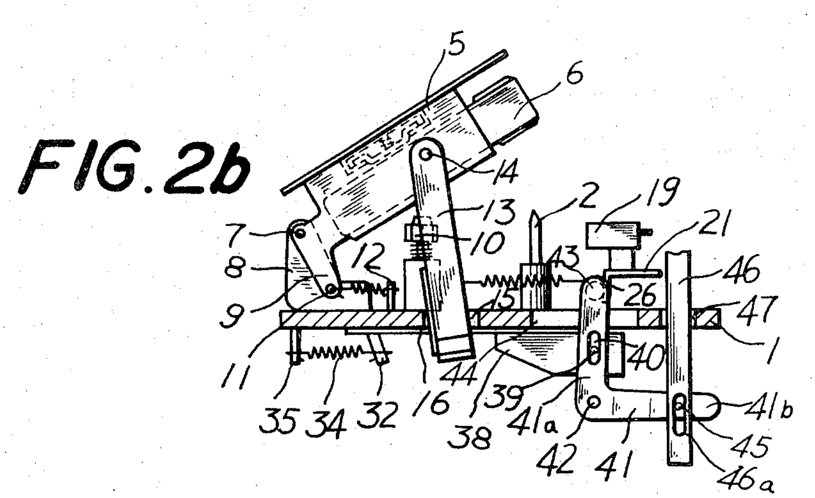
FIG. 2*b* is a lefthand side elevational view of the apparatus shown in FIG. 1*b;*

The actuating arm 46 is adapted to move upwardly and downwardly through an opening 47 of the chassis 1 as shown in FIG. 2*b*. The actuating arm may be associated with a push button in a conventional manner. When the actuating rod 46 is manually pushed downwardly, then the connecting member will be pivoted in a clockwise direction as viewed in FIG. 2*b* towards the position of the member as shown in FIGS. 1*b* and 2b until the roller 43 on the connecting member 41 forces the lug 26 of the head carrying lever 21 to cause the lever to be pivoted about the pin 22 away from the cassette 6 against the spring 24. At the same time, the lock member 16 moves in rightward direction until the bent portion **13*a* of the suspension bar 13 aligns with the L-shaped opening of the lock member 16 so that the suspension bar is released from its engagement with the lock member 16. Thus, the cassette receiving case 5 is pivoted upwardly about the pivot pins 7 and 7' by action of the spring 10 until it reaches the position in which the cassette can be removed from the cassette receiving case 6** as illustrated in FIGS. 1*b* and 2*b* . Rightward movement of the lock member 16 as viewed in FIG. 2b causes the arm 16b of the lock member 16 to press against the leg piece 32 of the swinging plate 29 and to be pivoted about the pins 31 in a counter-clockwise direction as viewed in FIG. 3b against the spring 34 so that the cassette pusher 30 on the swinging plate 29 is disengaged from the rear face of the cassette 6.

The cassette receiving case when positioned in FIGS. 1b and 2b is located at its front spaced from and over the tops of the reel shafts 3 and 3', the locating pins 2 and 2' and the capstan 4 so that the cassette 6 can be slid out of the cassette receiving case 5 without any interference from such components on the chassis 1.

When the cassette receiving case is depressed from the position as shown in FIGS. 1b and 2b, the suspension bar 13 moves downwardly through the slot 36 of the lock member 16 until the bent portion 13a of the suspension bar 13 moves beyond the lower face of the lock member 16 to disengage it with the slot 36. It should be understood, of course, that the lock member 16 is urged by action of the spring 24 to move rearwardly along the pins (not shown) extending through the slots 37 and 37'. Thus, when the bent portion of the suspension bar 13 is disengaged from the slot 36 in the lock member 16, the member 16 moves rearwardly to the position as shown in FIGS. 1a and 2a in which the suspension bar 13 and therefore, the cassette receiving case 5 are restrained by the lock member 16 from moving upwardly about the pins 7 and 7' to hold the case in position. With the cassette receiving case positioned in such manner the leg piece 32 of the swinging plate 29 is held spaced from the arm 16b of the lock member 16 so that the spring coil 34 urges the cassette pusher 30 on the swinging plate 29 to abut against the rear face of the cassette 6 to dispose it in recording position. Furthermore, in the position of the connecting member 41 as shown in FIGS. 1a and 2a, the head carrying member lever 21 is positioned in the advanced position in which the magnetic head 19 and the pinch roller 20 extend through the opening 17 and 18 respectively and engage the tape in the cassette to provide for the operation of the apparatus.

It is understood, of course, that the cassette 6 comprises a pair of reels between which the tape is wound, each having keyed or splined holes 49 and 49' for receiving the reel shafts 3 and 3' and a casing in which the reels are contained, with the locating holes 50 and 50' for receiving the corresponding locating pins 2 and 2' on the chassis. The cassette receiving case 5 comprises a stop (not shown) provided in the case for bearing on the cassette when received so that the holes 49, 49', 50 and 50' accurately align with the reel shafts 3 and 3' and the locating pins 2 and 2', respectively.

Figure 5A:
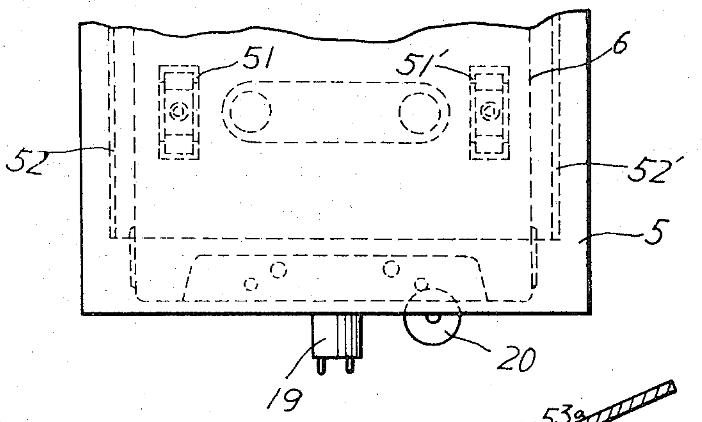
FIG. 5*a* is a fragmentary plan view of the cassette receiving case with cassette retaining or biasing devices thereof.

A pair of cassette biasing devices 51 and 51' are shown in dotted lines in FIG. 5a which are mounted on the inner face of the upper wall of the cassette receiving case 5. The case 5 also comprises side walls as indicated at 52 and 52' for guiding the cassette 6 along the walls when inserted into the case.

Figure 5B:
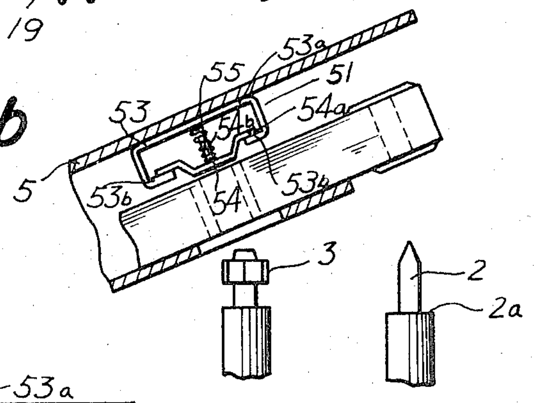
FIG. 5*b* is a side elevational view of the cassette retaining devices in the cassette receiving case shown in cross section when the cassette receiving case is in the non-operative position.
Figure 5C:
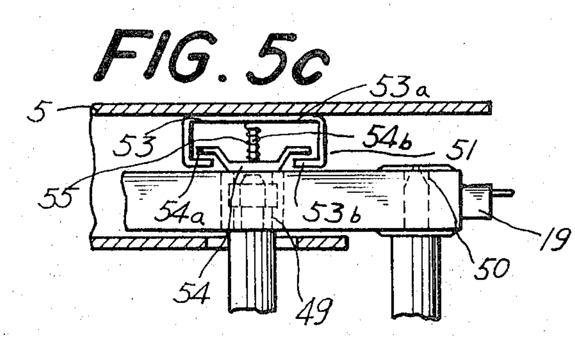
FIG. 5*c* is a side elevational view of the cassette retaining devices in the cassette receiving case shown in cross section when the cassette receiving case is in the operative position.

Each of the cassette biasing devices 51 and 51' comprises a channel-shaped body 53 having a flat portion 53a secured to the inner face of the upper wall of the case 5 by any suitable means and a pair of inward portions 53b spaced from each other and also from the flat portion, a movable member 54 having the opposite ends 54a adapted to engage and disengage the inward portions 53b of the body 53 and having a post 54b secured to the middle portion thereof by any suitable means, and a spring 55 wrapped around the post 54b on the movable member 54 for urging the movable member to move downwardly towards the inward portions of the body 53. The movable members of the cassette biasing devices 51 and 51' are spaced from the upper face of the cassette 6 when the latter is disposed within the cassette receiver 5 positioned as shown in FIG. 5b with the front side of the cassette receiving case 5 positioned over the reel shafts 3 and 3' and the locating pins 2 and 2' on the chassis 1, while in the position of the cassette receiving case 5 as shown in FIG. 5c wherein the cassette is in engagement with locating pins 2 and 2' and can be operated in cooperation with the reel shafts 3 and 3', the magnetic head 19 and the capstan 20, the movable members of the cassette biasing devices 51 and 51' resiliently contact the upper face of the cassette 6 against the springs 55 so that there exists a clearance between the both ends 54a of the movable members 54 and the inward portions 53b of the channel-shaped bodies 53 since the cassette is now raised from the bottom wall of the case 5 as hereinafter described.

Thus, in the position of the cassette receiving case 5 wherein it is moved upwardly and fully away from the chassis 1 under the action of springs 10, the cassette is not restrained by the movable members 54 of the cassette biasing devices 51 and 51' and therefore, the cassette 6 can be easily removed from the cassette receiving case 5 and inserted into the same. Furthermore, in the afore-said position of the cassette receiving case 5, the cassette 6 is free to move forwardly and rearwardly within the cassette receiving case so that when the case 5 will be depressed downwardly for pivotal movement about the axes of the pivot pins 7 and 7', the holes 49 and 49' for the reel shafts, the locating holes 50 and 50' and the through holes for the capstan are assured to extremely smoothly engage the corresponding reel shafts 3 and 3', the locating pins 2 and 2' and the capstan 4, respectively, without any accompanying friction. In this condition of the cassette receiving case 5 the lock member 16 is still restrained by the suspension bar 13 from moving rearwardly since the bent portion 13a of the bar engages the L-shaped slot 36 of the lock member and as a result, on one hand, the roller 43 on the connecting member 41 remains engaged with the lug 26 of the head carrying lever 21 against the spring 24 so that the lever 21 is located far away from the front face of the cassette 6 and, on the other hand, the leg piece 32 of the swinging plate 29 remains in the position as shown in FIG. 3b wherein the leg piece is forwardly displaced against the spring 34 so that the cassette pushing member 30 is prevented from engaging the rear face of the cassette 6.

The cassette receiving case 5 continues to be depressed so that the bottom face of the cassette 6 reaches the shoulders 2a and 2'a of the locating pins 2 and 2' to stop the downward movement of the cassette. At that time the clearance between the inward portions 53b of the body 53 and the upper surface of the cassette 6 allows the cassette receiving case 5 to be forced downwardly against the bias of spring 55 while the cassette 6 remains fixed under the spring bias. Such forced movement of the cassette receiving case 5 causes the bent portion 13a of the suspension bar 13 to be withdrawn from the L-shaped slot 36 in the lock member 16 to disengage the latter from the former. Accordingly, the lock member 16 moves leftwardly as viewed in FIG.2*a* and therefore, the head carrying lever 21 pivotally moves about the axis of the pivot pin 22 so that the magnetic head 19 and the pinch roller 20 extend through the openings 17 and 18 of the cassette 6, respectively, and contact the magnetic tape passing across the openings 17 and 18. At the same time, the cassette pushing member 30 on the swinging member 29 presses the cassette 6 under the force of the spring 34 to hold it between the locating pins 2 and 2' and the cassette pushing member 30. At that time, the cassette biasing devices 51 and 51' lightly depress the cassette 6 so that it can be held against budging upwardly and downwardly within the case 5. Because of the lock member 16 overlying the upper end of the bent portion of the suspension bar caused by leftward movement of the lock member as viewed in FIG.2*a*, the cassette receiving case 5 is held against pivotally moving upwardly about the axes of the pivot pins 7 and 7'.

When it is desired to withdraw the cassette 6 from the cassette receiving case 5, the actuating arm 46 may be depressed downwardly to pivotally move the connecting member 41 about the axis of the pivot pin 42 in a clockwise direction as viewed in FIG. 2*b*. When the connecting member 41 moves as just-aforesaid the suspension bar pivotally moves forwardly as viewed in FIG. 2*b* together with the lock member 16 until the bent portion 13*a* of the suspension bar 13 aligns with the L-shaped slot in the lock member 16 and therefore, the cassette receiving case 5 pivotally moves upwardly about the axes of the pivot pins 7 and 7' by action of the spring 10 together with the suspension bar 13. In order to avoid withdrawal of the suspension bar 13 from the slot 36 in the lock member 16, it is preferable to provide with the bent portion 56 on the lower end of the suspension bar 13 and in order to avoid impact upon the upper end of the bent portion 56 it is also preferable to provide a cushion member on the bent portion.

While one specific embodiment of the invention has been shown and described in detail it will be understood that the same is for illustration purpose only and is not to be taken as a definition of the invention and that various modifications and changes on the same will easily occur to those skilled in the art without departing from the scope and spirit of the invention as defined in the appended claims.

What is claimed is:

1. A magnetic recording and reproducing apparatus for use with a cassette containing a pair of reels between which a tape is wound, comprising a chassis having thereon a pair of reel shafts for driving the reels on the cassette, a capstan for feeding the tape in the cassette and a magnetic head for recording on the tape and reproducing therefrom, said magnetic head being movable between an advanced position in which the head contacts the tape in the cassette and a retracted position in which the head is separated from the cassette, means for moving the head from the retracted position to the advanced position, a cassette receiving case pivotally movable on the chassis, said cassette receiving case having a non-operative position in which the cassette can be inserted into and withdrawn from the cassette receiving case and an operative position in which the cassette cooperates with the magnetic head and the capstan on the chassis to effect recording and reproducing, said cassette also including walls defining locating holes through which extend corresponding locating pins on the chassis for positively holding the cassette in the operative position, means for moving the cassette receiving case from the non-operative position to the operative position, means for locking the cassette receiving case in the operative position, and means for resiliently pushing the cassette so that the locating pins on the chassis bear against the walls defining the locating holes in the cassette to hold the cassette in position when the cassette receiving case is in the operative position, characterized by further comprising a cassette biasing means in said cassette receiving case cooperative with said locating pins for opposing movement of said cassette upon engagement of said cassette with said locating pins, and for allowing said cassette receiving case to move relative to said cassette after such engagement, said means for resiliently pushing said cassette being restrained from pushing said cassette until such movement of said cassette receiving case relative to said cassette after said engagement, said cassette thereby being freely movable in said cassette receiving case before said engagement.

2. The magnetic recording and reproducing apparatus claimed in claim 1 further including means connected to said cassette receiving case moving means for maintaining said head in its retracted position until said movement of said cassette receiving case relative to said cassette after said engagement of said cassette with said locating pins.

3. The magnetic recording and reproducing apparatus claimed in claim 1 wherein said cassette receiving case has a suspension bar pivotally suspended therefrom and said means for locking the cassette receiving case in the operative position comprises a lock member slidable on the chassis for engaging said means for resiliently pushing the cassette and urging the same to disengage the cassette in response to the movement of said lock member in one direction whereby said cassette is released from said means for resiliently pushing said cassette before said engagement of said cassette with said locating pins, and an L-shaped slot through which said suspension bar extends, said suspension bar having a bent portion engaging said lock member for preventing the movement of said suspension bar out of said slot when said cassette receiving case is in its inoperative position.

4. The magnetic recording and reproducing apparatus claimed in claim 1 wherein said cassette biasing means comprises a body secured to said cassette receiving case, a movable member having at least one portion engageable with a portion of said body and a resilient member urging said movable member to engage said body, said cassette engaging said movable member and displacing said portion thereof from said body member portion against the bias of said resilient member upon said engagement of said cassette with said locating pins, said cassette receiving case thereby being movable relative to said cassette against the bias of said resilient member after said engagement.

5. In a magnetic recording and reproducing apparatus having a cassette containing a magnetic tape, a cassette receiving case, magnetic head means for recording on and reproducing from said tape, means for supporting said cassette receiving case in a non-operative position, wherein said cassette may be inserted into and removed from said cassette receiving case, and for supporting said cassette receiving case for movement in one direction from said non-operative position to an operative position, wherein said cassette may be placed in engagement with said magnetic head means, cassette locating means for insertion in said cassette upon movement of said cassette receiving case to said operative position thereof, and cassette pushing means for urging said cassette into engaging relation with said cassette locating means whereby said tape and said magnetic head are in such recording and reproducing relationship, the improvement which comprises:

a. cassette biasing means in said cassette receiving case for applying positioning bias to said cassette upon movement of said cassette receiving case to its said operative position and such insertion in said cassette of said cassette locating means, said cassette receiving case being further movable in said one direction relative to such positionally biased cassette; and b. means connected to said cassette receiving case supporting means for restraining said cassette pushing means from its said urging of said cassette into engaging relation with said cassette locating means until occurence of such movement of said cassette receiving case relative to said positionally-biased cassette.

* * * * *